Dec. 12, 1944.   J. R. BANKER   2,364,687
VACUUM TUBE VOLTMETER CIRCUIT
Filed April 24, 1943
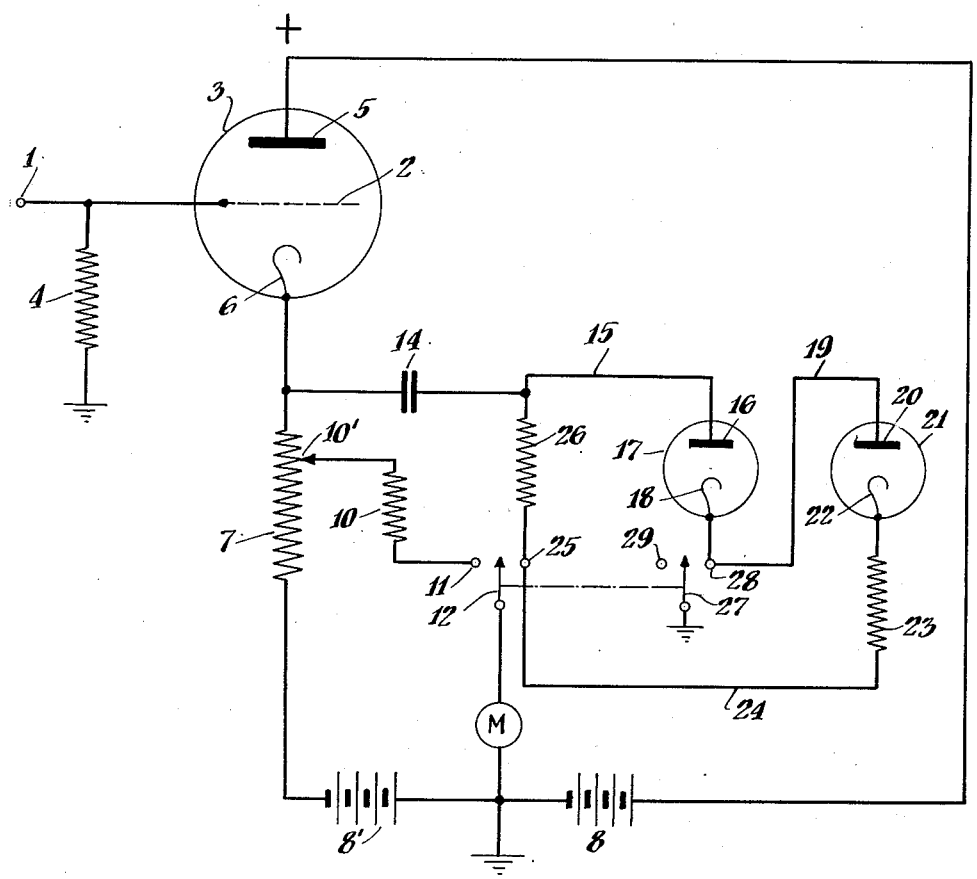
John Richard Banker, INVENTOR.
BY
Charles W. Mortimer
ATTORNEY Patented Dec. 12, 1944

2,364,687

UNITED STATES PATENT OFFICE 2,364,687

VACUUM TUBE VOLTMETER CIRCUIT

John Richard Banker, Passaic, N. J., assignor to Allen B. Du Mont Laboratories, Inc., Passaic, N. J., a corporation of Delaware Application April 24, 1943, Serial No. 484,498

10 Claims. (Cl. 171—95)

This invention relates to a voltmeter that can be used for measuring either direct or alternating voltages to determine potential differences.

In carrying out the invention an extraordinarily high impedance input up to millions of ohms per volt for indicating either direct current or alternating current potentials on the same linear scale may be used. The device has a very high degree of stability and when an alternating voltage is superposed upon a direct voltage level the direct voltage component is automatically subtracted when the A. C. voltage is being measured. In using the device for measuring alternating voltages a vacuum tube degenerative amplifier is followed by a diode rectifier and a sensitive microammeter.

The invention may be understood from the description in connection with the accompanying drawing, in which reference character 1 indicates the input terminal of the voltage that is to be measured. It is connected to the grid 2 of a tube 3 which may be a triode, for example. It is provided with grid leak 4. The plate 5 is connected to a source 8 of direct current voltage.

The cathode 6 of tube 3 is connected by resistance 7 to the negative end of source 8' of voltage which may be a duplicate of source 8. The positive end of this source 8' and the negative end of the source 8 are grounded. The resistance 7 is connected by a sliding contactor 10' on resistance 7 through resistance 10 to a terminal 11 which may be connected by switch 12 to one side of a microammeter M of which the other side is grounded. The part thus far described is for measuring direct current voltages.

For measuring alternating current voltages the cathode 6 is coupled by condenser 14 and lead 15 to the plate 16 of diode 17. The cathode 18 of this diode is connected by lead 19 to the plate 20 of a second diode 21, the cathode of which is connected through resistance 23 by lead 24 to terminal 25. A resistance 26 is connected between terminal 25 and lead 15. The switch 12 which may make contact with either terminal 11 or 25 is connected to microammeter M and is ganged with the switch 27 which may be contacted with terminal 28 to make ground connection at the end of lead 19 or plate 20, and also at the cathode 18. Or this switch 27 may make contact with the contact 29. This switch is left in its neutral position when the device is not in use.

When the switches 12 and 27 are turned to the left hand positions with zero potential on grid 2, current through tube 3 and resistance 7 causes an IR drop across resistance 7. The contacting point 10' is moved to the zero potential on resistance 7 with respect to ground, when the switch 12 is closed. This zero position point is the point of contact of contactor 10' on resistance 7 where no current flows through microammeter M.

When D. C. positive potential is applied to terminal 1, an increase of current flows through tube 3 causing more current to flow through resistance 7 and battery 8' thus raising the potential of cathode 6 and thus raising the potential at point 10' which causes current to flow through resistance 10 and microammeter M when the switch 12 is closed at terminal 11.

When the switches 12 and 27 are turned to the right hand positions to connect with the contacts 25 and 28, respectively, the microammeter M is ready to read the rectified current which is generated when A. C. voltage is applied to the grid 2.

A. C. voltage applied to grid 2 causes an A. C. voltage of the same frequency to appear at the cathode 6. This A. C. voltage at the cathode 6 is coupled by condenser 14 and lead 15 to the plate 16 of rectifier 17 and is rectified thus removing the positive half of the signal. Any direct current component that may reach the cathode 6 is eliminated by the condenser 14. The rectified current, which is the negative half of the signal, passes through resistance 26 and is indicated by the meter M. The emission current of diode 17 which would otherwise pass through microammeter M and cause an incorrect reading is balanced by the emission current through diode 21 and resistance 23 when the switch 12 makes contact with terminal 25 so that only the current that passes through the resistance 26 also passes through the meter M. This meter is calibrated to read in volts so that very small alternating voltages applied at the input terminal 1 result in producing easily read deflections of the meter M.

What is claimed is:

1. A voltmeter circuit, comprising a vacuum tube having a plate, a grid and a cathode, and also comprising a fixed resistance in the cathode circuit of said tube, a meter and a resistance in series between a variable point on said first named resistance and ground, and terminals for connecting sources of direct current potential from ground to said plate and said fixed resistance, respectively.

2. The circuit of claim 1, in which means for applying a voltage to be measured to the grid of said tube is used.

3. The device of claim 1, in which the positive end of one of said sources of potential is grounded.

4. The device of claim 1, in which said vacuum tube is a triode.

5. The device of claim 1, in which said fixed resistance and source of potential are so proportioned and connected that a point on said first named resistance is at zero potential when no potential is applied to the grid of said tube.

6. A voltmeter circuit, comprising a vacuum tube having a plate, a grid and a cathode, and also comprising a fixed resistance in the cathode circuit of said tube, a condenser, resistance and meter in series between said cathode and ground and in parallel with said first named resistance, terminals for connecting sources of direct current potential from ground to said plate and said fixed resistance, respectively, and a diode connected between the junction of said condenser and said last named resistance and ground.

7. The device of claim 6, in which a diode is also provided to balance the emission current of the first named diode.

8. The device of claim 6, in which a diode is also provided to balance the emission current of the first named diode, and means are provided to ground the cathode of the first named diode and the plate of the other one.

9. A voltmeter circuit, comprising a vacuum tube having a plate, a grid and a cathode, and also comprising a fixed resistance in the cathode circuit of said tube, a meter, a switch and a resistance in series between said cathode and ground in one position of said switch, said meter and switch being in parallel with said first named resistance in another position of said switch, terminals for connecting sources of direct current potential from ground to said plate of said first named resistance, respectively, and means comprising diodes to adapt the circuit for reading alternating current voltages in said last named position of said switch.

10. The device of claim 6, in which means is provided to remove any direct current component when alternating voltages are being measured.

JOHN RICHARD BANKER.